United States Patent
Sun et al.

(10) Patent No.: US 9,548,054 B2
(45) Date of Patent: Jan. 17, 2017

(54) SPEAKER AUTHENTICATION METHODS AND RELATED METHODS OF ELECTRONIC DEVICES USING CALENDAR DATA

(75) Inventors: Liang-Che Sun, Taipei (TW); Yiou-Wen Cheng, Hsinchu (TW)

(73) Assignee: MEDIATEK INC., Hsin-Chu (TW)

( * ) Notice: Subject to any disclaimer, the term of this patent is extended or adjusted under 35 U.S.C. 154(b) by 985 days.

(21) Appl. No.: 13/596,082

(22) Filed: Aug. 28, 2012

(65) Prior Publication Data

US 2013/0304478 A1 Nov. 14, 2013

Related U.S. Application Data

(60) Provisional application No. 61/645,645, filed on May 11, 2012.

(51) Int. Cl.
| | |
|---|---|
| G10L 21/00 | (2013.01) |
| G10L 25/00 | (2013.01) |
| G10L 15/00 | (2013.01) |
| G10L 17/22 | (2013.01) |
| G10L 17/00 | (2013.01) |
| G10L 17/04 | (2013.01) |
| G10L 25/90 | (2013.01) |

(52) U.S. Cl.
CPC ............. *G10L 17/22* (2013.01); *G10L 17/005* (2013.01); *G10L 17/04* (2013.01); *G10L 25/90* (2013.01)

(58) Field of Classification Search
CPC ............................... G10L 17/005; G10L 15/20
USPC ........................................................ 704/207
See application file for complete search history.

(56) References Cited

U.S. PATENT DOCUMENTS

| | | | |
|---|---|---|---|
| 5,414,755 A * | 5/1995 | Bahler et al. ............... | 379/88.02 |
| 6,651,168 B1 | 11/2003 | Kao | |
| 7,231,657 B2 | 6/2007 | Honarvar | |
| 2003/0163739 A1 | 8/2003 | Armington | |
| 2005/0232471 A1 | 10/2005 | Baer | |
| 2006/0021003 A1 | 1/2006 | Fisher | |
| 2008/0016002 A1 | 1/2008 | Beenau | |
| 2008/0300871 A1* | 12/2008 | Gilbert ..................... | G10L 15/20 |
| | | | 704/233 |
| 2011/0276323 A1* | 11/2011 | Seyfetdinov .................. | 704/207 |
| 2012/0303369 A1* | 11/2012 | Brush ..................... | G10L 17/02 |
| | | | 704/246 |

FOREIGN PATENT DOCUMENTS

| | | | |
|---|---|---|---|
| CN | 1291324 A | 4/2001 | |
| CN | 1924998 A | 3/2007 | |
| EP | 1001407 A2 | 5/2000 | |

* cited by examiner

*Primary Examiner* — Farzad Kazeminezhad
(74) *Attorney, Agent, or Firm* — Winston Hsu; Scott Margo

(57) ABSTRACT

An embodiment of the invention provides a method of preparing for speaker authentication. The method includes: receiving speech data that represents an utterance made by a user; extracting side information; examining the side information to determine whether to allow speaker model training using the speech data; and generating a feedback message for the user based on the side information if speaker model training using the speech data is not allowed; wherein the feedback message contains a message indicating at least a condition of the side information comprising calendar data to the user.

10 Claims, 5 Drawing Sheets

SPEAKER AUTHENTICATION METHODS AND RELATED METHODS OF ELECTRONIC DEVICES USING CALENDAR DATA

CROSS REFERENCE TO RELATED APPLICATIONS

This application claims the benefit of U.S. provisional application No. 61/645,645, filed on May 11, 2012 and incorporated herein by reference.

BACKGROUND

1. Technical Field

The invention relates generally to speaker authentication, and more particularly, to speaker authentication methods that generate feedback messages based on additionally extracted side information.

2. Related Art

An electronic device may implement biometric authentication technologies to verify the identity of a user before deciding whether to grant access. Generally speaking, after verifying the user's identity, a conventional device has only two choices: either granting access and replying with an invariable greeting message or denying access and replying with an invariable fail message. The invariable greeting/fail message is not very helpful to the user.

For example, if the user is a true owner of the device but has been rejected by the device several times, the user may think that the biometric authentication function has bad performance. Being unaware of the potential reasons behind the false rejections, the true owner may disable the biometric authentication function of the device, giving up the potential benefits of the feature.

SUMMARY

A first embodiment of the invention provides a method of preparing for speaker authentication. The method includes: receiving speech data that represents an utterance made by a user; extracting side information; examining the side information to determine whether to allow speaker model training using the speech data; and generating a feedback message for the user based on the side information if speaker model training using the speech data is not allowed.

A second embodiment of the invention provides a speaker authentication method. The method includes: receiving speech data that represents an utterance made by a user; extracting side information; performing speaker authentication using the speech data and a trained speaker model; and generating a feedback message for the user based on the side information and a speaker authentication result.

A third embodiment of the invention provides an electronic device. The device includes a side information extractor, a speaker model creator, and a message generator. The side information extractor is configured to extract side information and examine the side information to determine whether to allow speaker model training using speech data that represents an utterance made by a user. The speaker model creator is coupled to the side information extractor and is configured to train a speaker model using the speech data if the side information extractor allows speaker model training using the speech data. The message generator is coupled to the side information extractor, and is configured to generate a feedback message for the user based on the side information if the side information extractor does not allow speaker model training using the speech data.

A fourth embodiment of the invention provides an electronic device. The device includes a side information extractor, a speaker authenticator, and a message generator. The side information extractor is configured to extract side information. The speaker authenticator is configured to perform speaker authentication using speech data and a trained speaker model. The speech data represents an utterance made by a user. The message generator is coupled to the side information extractor and the speaker authenticator, and is configured to generate a feedback message for the user based on the side information and an authentication result provided by the speaker authenticator.

Other features of the present invention will be apparent from the accompanying drawings and from the detailed description which follows.

BRIEF DESCRIPTION OF THE DRAWINGS

The invention is fully illustrated by the subsequent detailed description and the accompanying drawings, in which like references indicate similar elements.

DETAILED DESCRIPTION

An electronic device may use speaker authentication to verify whether its user is an authorized person or an impostor. Generally speaking, this feature requires the authorized person to train a speaker model first in a preparation phase. Then, in a testing phase, the device may use the trained speaker model that is specific to the authorized person to verify whether a person trying to use the device is the authorized one. Generally speaking, when in the preparation/testing phase, a conventional device does not try to gather side information related to the current environment or the speaker's emotion/health condition or recent events, not to mention using the side information to enhance the user's experience in the preparation/testing process.

Figure 1:
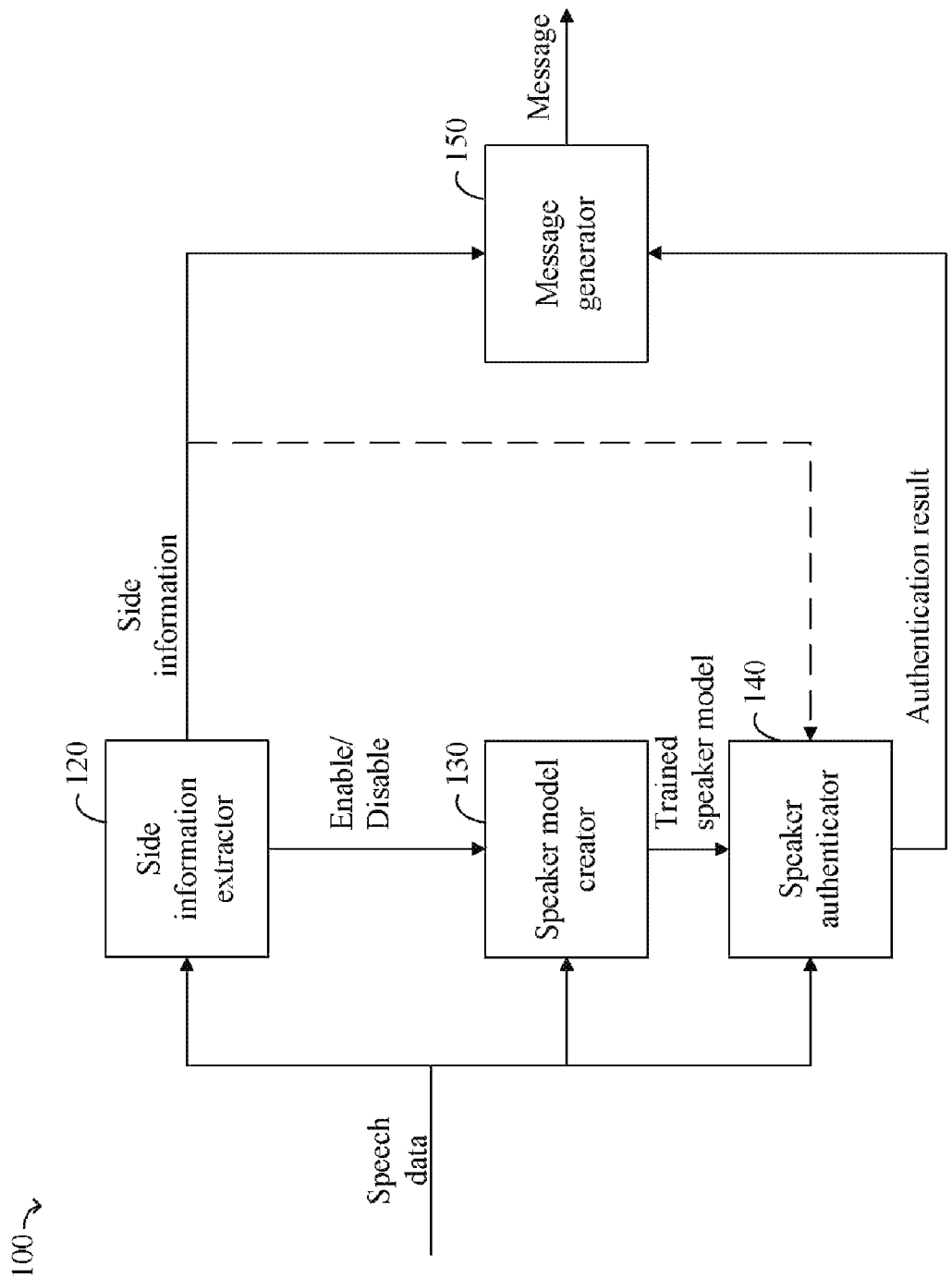
FIG. 1 shows a simplified block diagram of an electronic device according to an embodiment of the invention.

FIG. 1 shows a simplified block diagram of an electronic device according to an embodiment of the invention. For example, this device 100 may be a piece of user equipment, such as a smart phone, a tablet computer, or a smart television, and may be capable of converting an utterance made by a user into speech data. As another example, the device 100 may be one in the cloud that provides cloud computing services, and may be capable of receiving speech data that represents an utterance made by a user to a piece of user equipment.

In addition to other components omitted from FIG. 1 for the sake of simplicity, the device 100 includes a side information extractor 120, a speaker model creator 130, a speaker authenticator 140, and a message generator 150. The side information extractor 120 is responsible for extracting side information that reveals any or a combination of the followings: the environment in which the speech data is generated, the health condition of the person making the utterance represented by the speech data, the emotion of the person making the utterance, and the recent events of the person. The side information extractor 120 is further responsible for enabling/disabling the speaker model creator 130 in a preparation phase.

Figure 2:
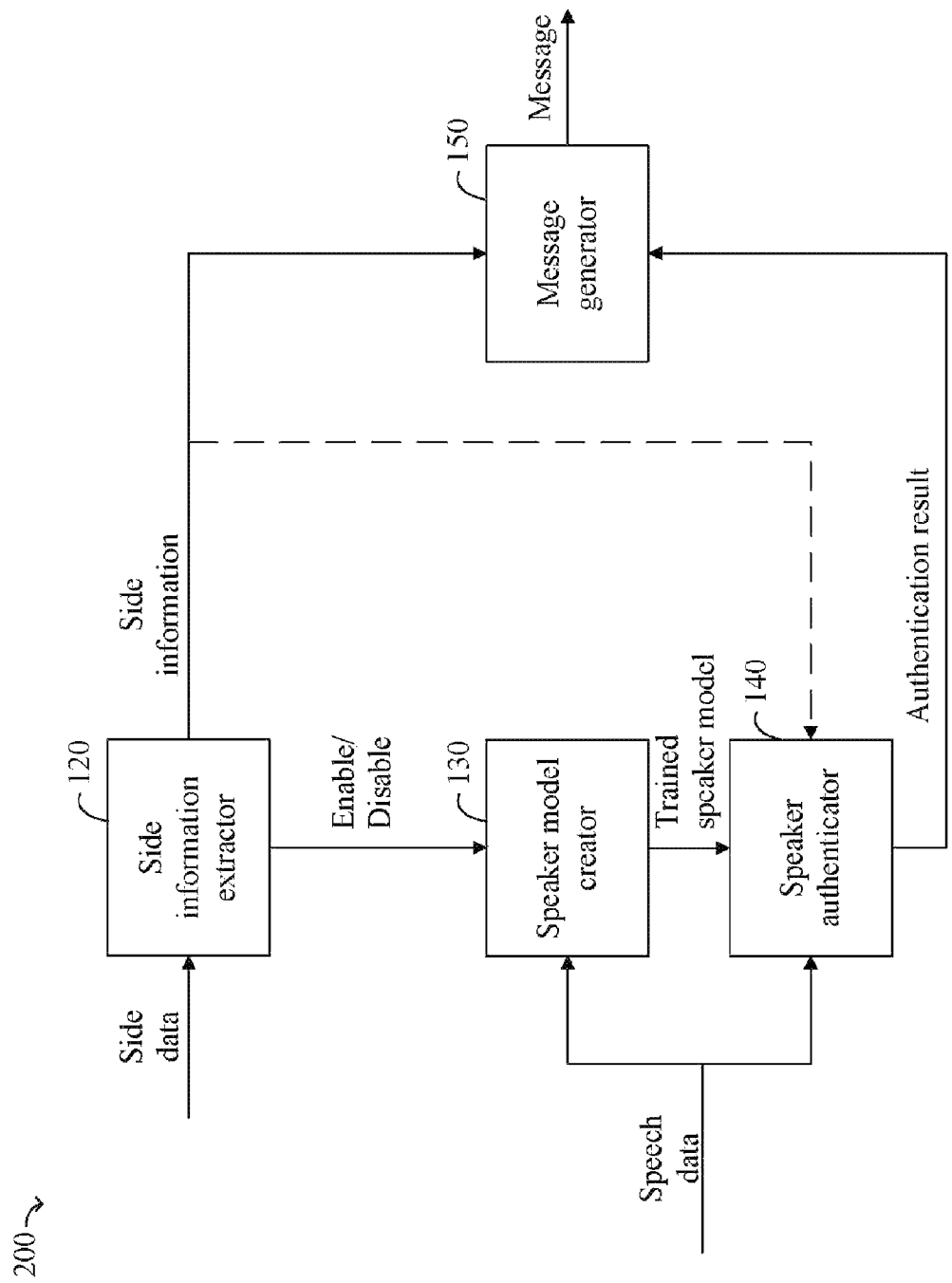
FIG. 2 shows a simplified block diagram of an electronic device according to another embodiment of the invention.

FIG. 2 shows a simplified block diagram of an electronic device according to another embodiment of the invention. The device 200 of FIG. 2 and the device 100 of FIG. 1 are very similar. One of the differences between these two devices is that the side information extractor 120 of the device 200 extract the side information from side data unrelated to the speech data. As examples, the side data may be related to or be provided by any or a combination of the following: a calendar, a schedule, an alarm clock, a positioning module, and a weather application.

Figure 3:
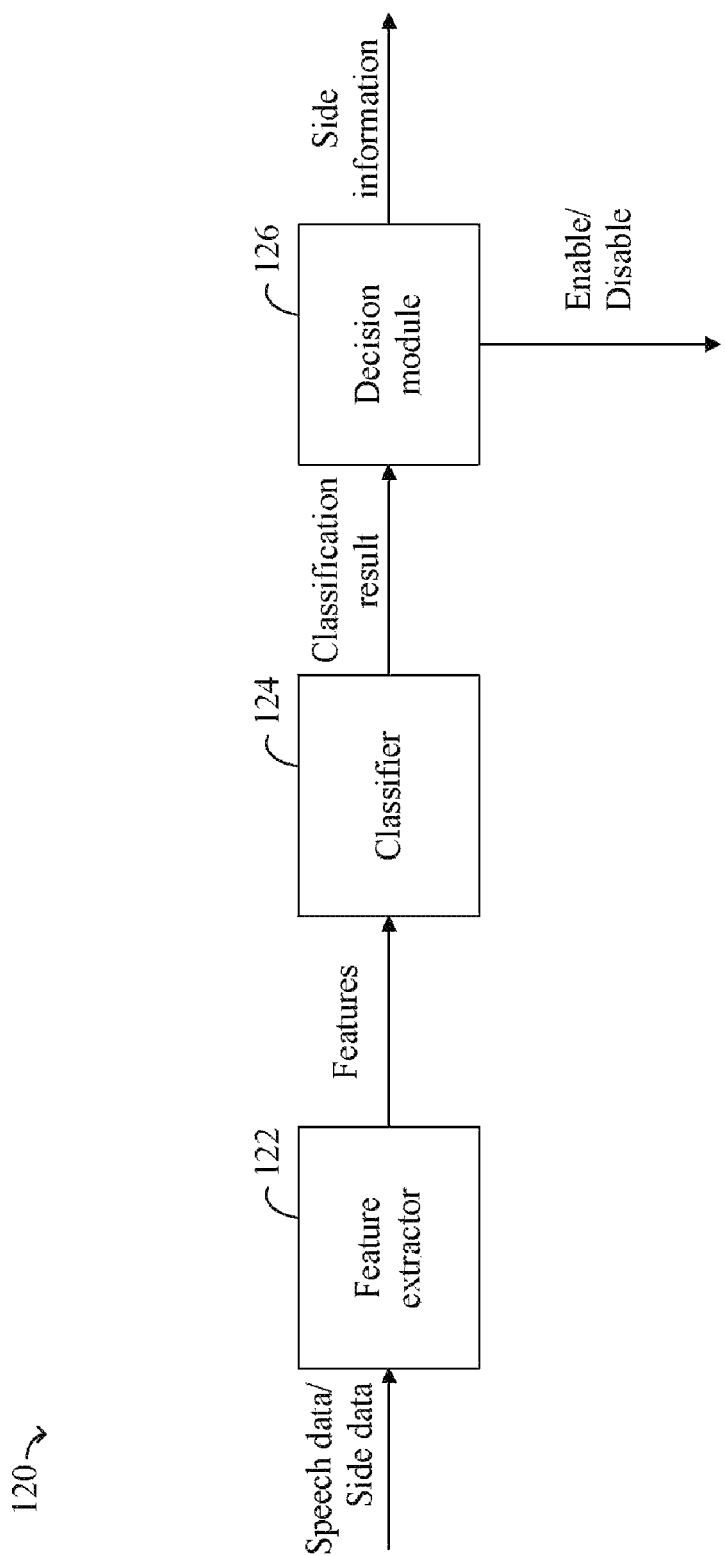
FIG. 3 shows a simplified block diagram of the side information extractor of FIG. 1/2 according to an embodiment of the invention.

FIG. 3 shows a simplified block diagram of the side information extractor of FIG. 1/2 according to an embodiment of the invention. The side information extractor 120 of this embodiment includes a feature extractor 122, a classifier 124, and a decision module 126. To put it simply, the feature extractor 122 extract features from the speech data/side data, the classifier 124 classifies the features, and the decision module 126 generates the side information based on the classification result and enables/disables the speaker model creator 130 based on the side information. In another embodiment, some or all the functions of the decision module 126 may be performed by the message generator 150. For example, the decision module 126 may generates the side information based on the classification result and let the message generator 150 decide whether to enable or disable the speaker model creator 130.

Figure 4:
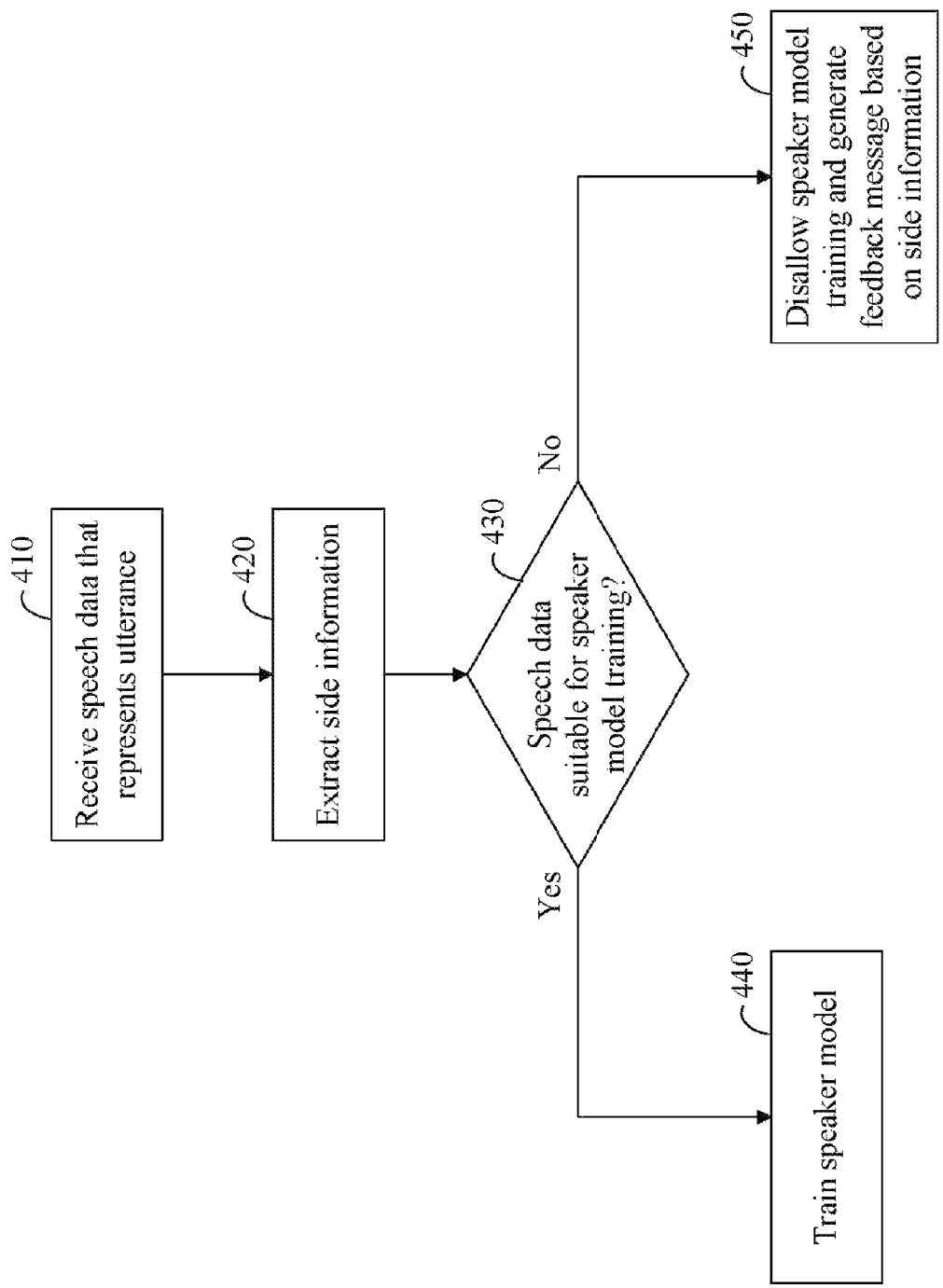
FIG. 4 shows a simplified flowchart of a method the device of FIG. 1/2 performs in a preparation phase.

The device 100/200 has at least a preparation phase and a testing phase. FIG. 4 shows a simplified flowchart of a method the electronic device 100/200 of FIG. 1/2 performs in the preparation phase. First, at step 410, the speaker model creator 130 receives the speech data that represents an utterance made by a user, who is likely an authorized one.

Next, at step 420, the side information extractor 120 extracts side information. The side information, which may be extracted from the speech data or from the side data, may reveal information of the scene in which the utterance is made. For example, the side information is unrelated to the verbal content of the utterance.

Step 420 may be divided into a three sub-steps. At the first sub-step of step 420, the feature extractor 122 extracts features from the speech data/side data. For example, if the feature extractor 122 receives the speech data as its input, the features may include spectral features such as Mel-Frequency Cepstral Coefficients (MFCC), Perceptual Linear Prediction (PLP), Line Spectral Pairs (LSP), and Linear Prediction Cepstral Coefficients (LPCC); prosodic features such as pitch, delta-pitch, formant, and vocal tract related features; spectro-temporal feature such as Gabor features, RelAtive SpecTrA (RASTA), temporal pattern (TRAP), and speaking rate; other features such as Signal-to-Noise Ratio (SNR). If the feature extractor 122 receives the side data as its input, the features may be related to some recent events/plans/tasks or some recent location information contained in the side data.

Then, at the second sub-step of step 420, the classifier 124 classifies the features provided by the feature extractor 122. In doing so, the classifier 124 may use one or a combination of the followings: Gaussian Mixture Model (GMM), Hidden Markov Model (HMM), Neural net/Multi-Layer Perceptron (MLP), Support Vector Machine (SVM), Random Forest, Decision Tree, Conditional Random Field (CRF), Adaboost, and so on. As another example, the classifier 124 may use a pre-trained model to perform classification.

Next, at the third sub-step of step 420, the decision module 126 generates the side information based on the classification result. As a first example, the feature extractor 122, the classifier 124, and the decision module 126 as a whole may function as an environment detector and the side information may reveal details of the environment the user is in when making the utterance. For instance, the side information may indicate whether the environment sounds noisy/quiet, windy/rainy, or like an outdoor/indoor one, etc. The side information may even be more specific and indicate whether the environment sounds like or has been positioned as a restaurant, a sport stadium, or a train station, etc.

As a second example, the side information extractor 120 may function as a health detector that detects the user's health condition in making the utterance. For instance, the side information may indicate whether it sounds like that the user is coughing, snuffling, or having a running nose, or indicate that the user may be sick because there is a recent doctor's appointment in the calendar. As a third example, the side information extractor 120 may function as an emotion detector that detects the user's emotion in making the utterance. For instance, the side information may indicate whether the user is happy, angry, or sad. As a fourth example, the side information extractor 120 may function as an event detector and detect a recent event of the user.

Then, at step 430, the decision module 126 examines the side information to determine whether the speech data is suitable for speaker model training. If the answer is yes, the device 100/200 enters step 440; otherwise, the device 100/200 goes to step 450.

Ideally, the speech data is suitable for speaker model training if in making the utterance, the user is calm, in good health condition, and the environment is quiet. If that the device 100/200 uses unsuitable speech data to perform speaker model training, the resulting trained speaker model will likely be an inferior one and may not function well in the subsequent testing phase. For example, a trained speaker model created based on unsuitable speech data may result in more false rejections/acceptances at the testing phase. Therefore, step 430 is like a gate keeper, ensuring that the device 100/200 performs speaker model training only with suitable speech data.

For example, the device 100/200 may decide not to train the speaker model by leaving step 430 and entering step 450 if the side information implies any or a combination of the following facts: the utterance is made in an outdoor/noisy/windy/rainy environment with too much interfering noise; the utterance is made in an environment (such as a restaurant) in which the utterance (which may contain private/sensitive information) may be overheard by another person; the user is not healthy/calm and hence the utterance is not made with the user's usual voice.

At step 440, the decision module 126 allows/enables the speaker model creator 130 to train a speaker model using the speech data. Once the speaker model creator 130 has finished the training process successfully, the speaker model creator 130 may pass the trained speaker model to the speaker authenticator 140.

At step 450, the decision module 126 disallows speaker model training (e.g. by disabling the speaker model creator 130) and the message generator 150 generates a feedback message for the user based on the side information. For example, the device 100/200 may display the generated message visually or play the message as a sound track so that the user may see/hear the content of the message. The generated message may help the user understand why the speech data is not suitable for speaker model training and hence may prevent the user from misapprehending the reliability/quality of the device 100/200's speaker authentication feature.

For example, based on the side information, the message generator 150 may select the message from a group of many candidate messages prepared for different situations. Some exemplary candidate messages of the group of comprehensive candidate messages include:

"It's noisy here. It's advised that you perform speaker model training at a quiet place."

"This place seems crowded with people. If you perform speaker model training here, other people may overhear your private/sensitive information."

"You sound ill today. It's advised that you perform speaker model training after restoring from illness. Your voice should be more stable then."

"You sound angry. Maybe you should perform speaker model training when you're calm and have stable voice."

"The calendar indicates that you're going to have an appointment soon. Maybe you should perform speaker model training next time."

Each of the candidate messages explains to the user the potential reason why speaker model training in not proper in the circumstances and hence is much more meaningful than an invariable canned message a conventional device may reply without relying on the side information. The comprehensive group of candidate messages used by the message generator 150 may improve the user's experience and prevent the user from blaming the speaker authentication feature unjustly.

After the device 100/200 has created a trained speaker model for the user at step 440, it may allow an authentication threshold to be adjusted by the device 100/200 itself or by the user. For example, the device 100/200 may first adjust the authentication threshold according to a user instruction. Then, the device 100/200 may perform a speaker authentication test with the adjusted authentication threshold to determine whether to retain the adjusted authentication threshold. If the speaker authentication test shows that the adjusted authentication threshold has too much risk of false rejections, the device 100/200 may decide not to retain the adjusted authentication threshold and advise the user not to set the authentication threshold so high. If the speaker authentication test shows that the adjusted authentication threshold has too much risk of false acceptances, the device 100/200 may decide not to retain the adjusted authentication threshold and advise the user not to set the authentication threshold so low.

Figure 5:
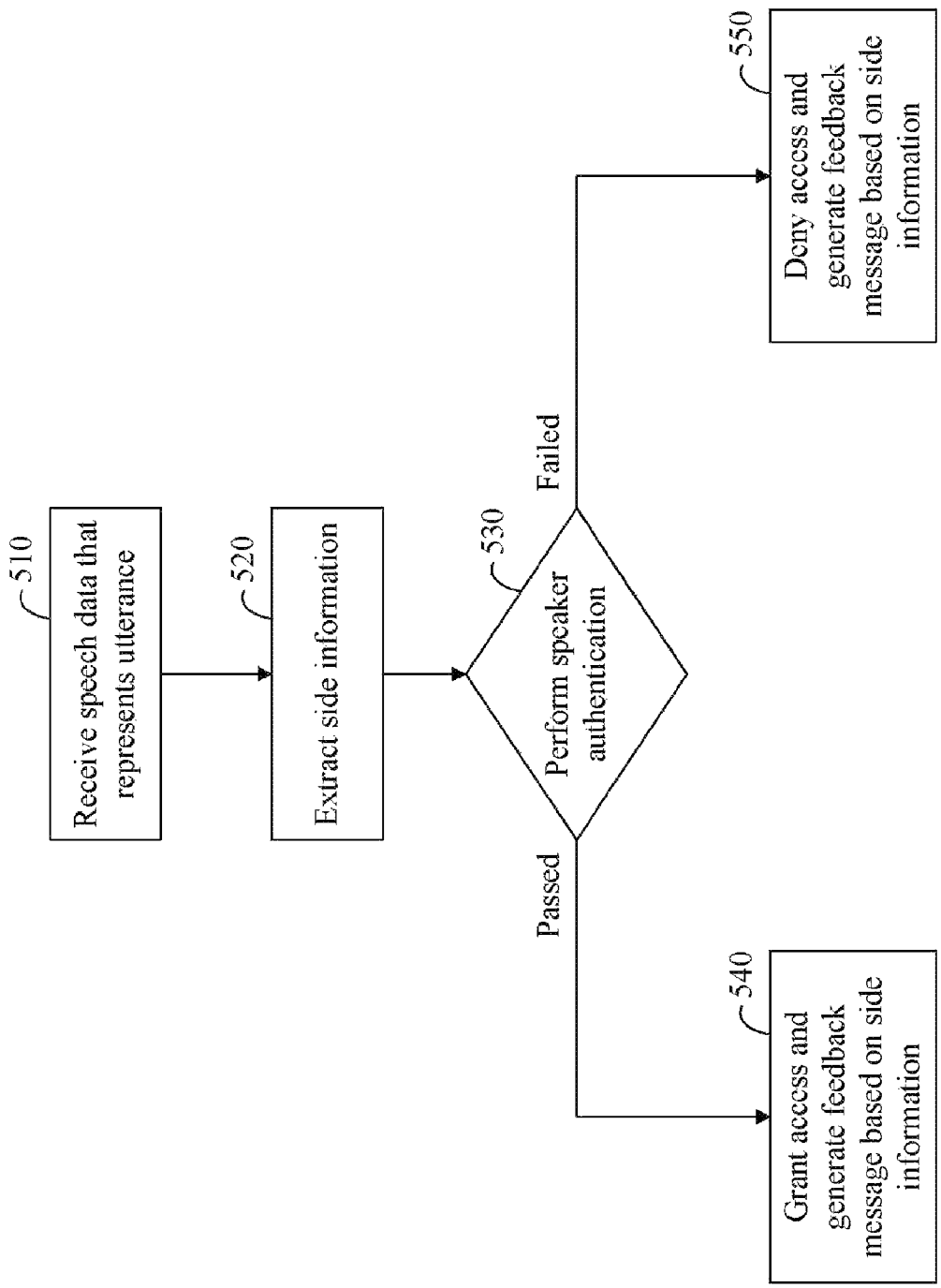
FIG. 5 shows a simplified flowchart of a method the device of FIG. 1/2 performs in a testing phase.

As mentioned above, the device 100/200 further has a testing phase. FIG. 5 shows a simplified flowchart of a method the electronic device 100/200 of FIG. 1/2 performs in the testing phase. First, at step 510, the speaker authenticator receives a piece of speech data that represents an utterance made by a user. Although this step seems very similar to step 410, at step 510, the device 100/200 is uncertain as to whether the user is the authorized user whom the trained speaker model is specific to. In addition, step 510 may occur when the user wants to turn on or to unlock the device 100/200, or to access some private/sensitive information using the device 100/200.

At step 520, the side information extractor 120 extracts side information for the user. Because this step is the very similar to step 420 discussed above, redundant explanation will be omitted herein.

At step 530, the speaker authenticator 140 performs speaker authentication using the speech data and the trained speaker model. If the user passes the test, the device 100/200 enters step 540; if the user fails the test, the device 100/200 goes to step 550.

For example, at step 530, the speaker authenticator 140 may generate a score that indicates to what extent the speech data matches the trained speaker model. The higher the score, the more likely that the user making the utterance is the authorized user. If the score lies within a first range, e.g. which may encompass scores larger than the authentication threshold, the device 100/200 may go to step 540 to grant access. If the score lies within a second range, e.g. which may encompass scores equal to and smaller than the authentication threshold, the device 100/200 may go to step 550 to deny access to the user.

At step 530, the device 100/200 may rely on not only the speech data and the trained speaker model, but also the side information. For example, if the side information indicates that the user is in a noisy environment, the device 100/200 may do one or a combination of the followings at step 530 to avoid false rejection: set the authentication threshold lower; suppress noise more aggressively; let the classifier 124 function as a noisy classifier. As another example, if the side information indicates that the user is angry, the device 100/200 may do one or a combination of the followings at step 530 to avoid false rejection: give more confidence score on pitch-related features; normalize the pitch-related features of the speech data.

After step 530, the device 100/200 will generate a feedback message for the user based on the side information and the authentication result. Specifically, if the authentication result shows that the user has passed the test, at step 540 the device 100/200 grants access to the user and generates a greeting message for the user based on the side information. For example, the device 100/200 may display the generated message visually or play the message as a sound track so that the user may see/hear the content of the message.

To give the user a response that contains more useful information, at step 540 the message generator 150 may select the message from a group of many candidate greeting messages based on the side information. The followings are some exemplary candidate greeting messages of the comprehensive group of candidate greeting messages prepared for different situations:

"Welcome. The weather doesn't sound good. Be careful not to catch a cold."

"Good morning/day/evening."

"Today is a sunny day. Good luck."

"Good to see you again. Don't forget your appointment at one o'clock."

"How about the lunch today?"

"Please be quite when you are in a movie theater."

"Have fun at this playground."

"You sound ill. Should I make a doctor's appointment for you?"

"Don't be sad. Everything will be fine."

"Don't be angry. Please calm down."

To the user, these candidate greeting messages may be much more meaningful than an invariable canned message a conventional device may reply without relying on the side information. These candidate greeting messages may give the user better user experience.

At step 550, the device 100/200 denies access to the user and generates a feedback message for the user based on the side information. For example, the device 100/200 may display the generated message visually or play the message as a sound track so that the user may see/hear the content of the message.

To give the user a response that contains more useful information, at step 550 the message generator 150 may select the message from a group of many candidate fail messages based on the side information. The followings are some exemplary candidate fail messages of the comprehensive group of candidate fail messages prepared for different situations:

"Your voice is too low. Please speak louder."

"You sound ill. Maybe that's why your voice didn't pass the authentication test."

"It's noisy here. Please consider speaking closer to the microphone or using the touchscreen to unlock."

"You sound too agitated. Please try again when you are calm."

"This place seems to be crowded with people. Be careful not to let others overhear your password."

Even though the user has failed the test, if the score lies within a third range, e.g. which may encompass scores between the authentication threshold and the authentication threshold minus a small margin, the device 100/200 may apply the concept of "sequential test" and give the user another test. For example, the device 100/200 may first generate a fail message at step 550 to encourage the user to try again. After the second test, the device 100/200 may decide whether to grant access based on an average of the two scores the user gets from the two tests.

To the user, the selected message may contain much more useful information than an invariable canned message (e.g. "access denied") a conventional device may reply without relying on the side information. Even if the user has been wrongly rejected by the device 100/200, he/she may understand the potential reason and not blame the speaker authentication function unjustly.

In the foregoing detailed description, the invention has been described with reference to specific exemplary embodiments thereof. It will be evident that various modifications may be made thereto without departing from the spirit and scope of the invention as set forth in the following claims. The detailed description and drawings are, accordingly, to be regarded in an illustrative sense rather than a restrictive sense.

What is claimed is:

1. A method of calibrating an electronic device for speaker authentication, comprising:
   receiving speech data that represents an utterance made by a user;
   utilizing a side information extractor of the electronic device to extract side information when the speech data is received, and examine the side information to determine whether the received speech data can be used as reference speech data for authentication of the electronic device;
   when the received speech data is determined to be unable to be used as the reference speech data based on the side information, utilizing a message generator of the electronic device to generate a feedback message for the user, the feedback message instructing the user to provide new speech data;
   when the received speech data is determined to be able to be used as the reference speech data based on the side information, allowing speaker model training using the speech data, to use the speech data as reference data for speaker authentication of the electronic device;
   utilizing a speaker authenticator of the electronic device to perform speaker authentication using the speech data, and utilizing the message generator of the electronic device to generate a feedback message for the user based on the side information and a speaker authentication result, wherein the feedback message contains a message indicating at least a condition of the side information to the user;
   wherein the side information comprises calendar data.

2. The method of claim 1, further comprising:
   after speaker model training on the reference data, adjusting an authentication threshold according to a user instruction; and
   performing a speaker authentication test using the adjusted authentication threshold to determine whether to retain the adjusted authentication threshold.

3. The method of claim 1, wherein the side information is unrelated to verbal content of the utterance.

4. The method of claim 1, wherein the step of extracting the side information comprises:
   extracting the side information from the speech data.

5. The method of claim 1, wherein the step of extracting the side information comprises:
   extracting the side information from side data unrelated to the speech data.

6. The method of claim 1, wherein the step of extracting the side information comprises:
   detecting at least one of an environment in which the user makes the utterance, health condition of the user, an emotion of the user, and a recent event of the user.

7. An electronic device, comprising:
   a side information extractor, configured to extract side information when speech data is received, and examine the side information to determine whether the received speech data can be used as reference speech data for speaker authentication of the electronic device, the speech data representing an utterance made by a user;
   a speaker model creator, coupled to the side information extractor, configured to train a speaker model using the speech data if the side information extractor determines the received speech data can be used as reference data for the electronic device so that the received speech data can be used as reference data for speaker authentication of the electronic device;
   a speaker authenticator, configured to perform speaker authentication using the speech data; and
   a message generator, coupled to the side information extractor and the speaker authenticator, configured to generate a feedback message for the user based on the side information when the side information extractor determines the received speech data cannot be used as reference data for the electronic device, the feedback message instructing the user to provide new speech data, and configured to generate a feedback message for the user based on the side information and an authentication result provided by the speaker authenticator wherein the feedback message contains a message indicating at least a condition of the side information to the user;
   wherein the side information comprises calendar data.

8. The device of claim 7, wherein the side information extractor comprises:
   a feature extractor, configured to extract features from the speech data;
   a classifier, coupled to the feature extractor, configured to classify the features; and a decision module, coupled to the classifier, the speaker model creator, and the message generator, configured to generate the side information based on a classification result provided by the classifier and control the speaker model creator based on the side information.

9. The device of claim 7, wherein the side information extractor comprises:
a feature extractor, configured to extract features from side data unrelated to the speech data;
a classifier, coupled to the feature extractor, configured to classify the features; and
a decision module, coupled to the classifier, the speaker model creator, and the message generator, configured to generate the side information based on a classification result provided by the classifier and control the speaker model creator based on the side information.

10. The device of claim 7, wherein the side information extractor is configured to detect at least one of an environment in which the user makes the utterance, health condition of the user, an emotion of the user, and a recent event of the user.

* * * * *